A. JENSEN.
LIQUID PASTEURIZER AND COOLER.
APPLICATION FILED SEPT. 3, 1913.
1,080,455.
Patented Dec. 2, 1913.
2 SHEETS—SHEET 2.
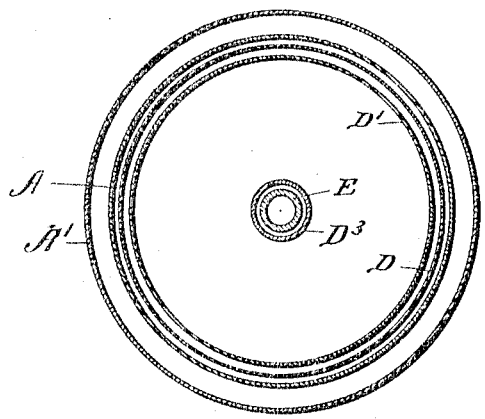
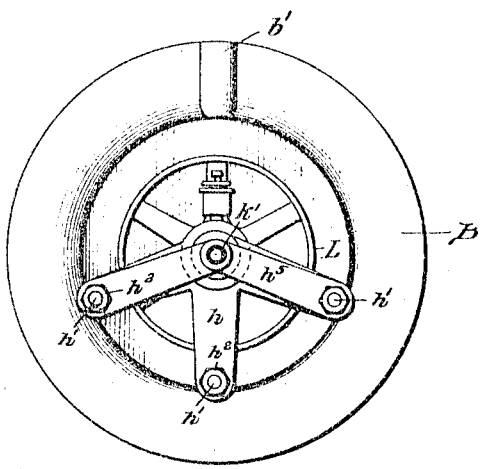

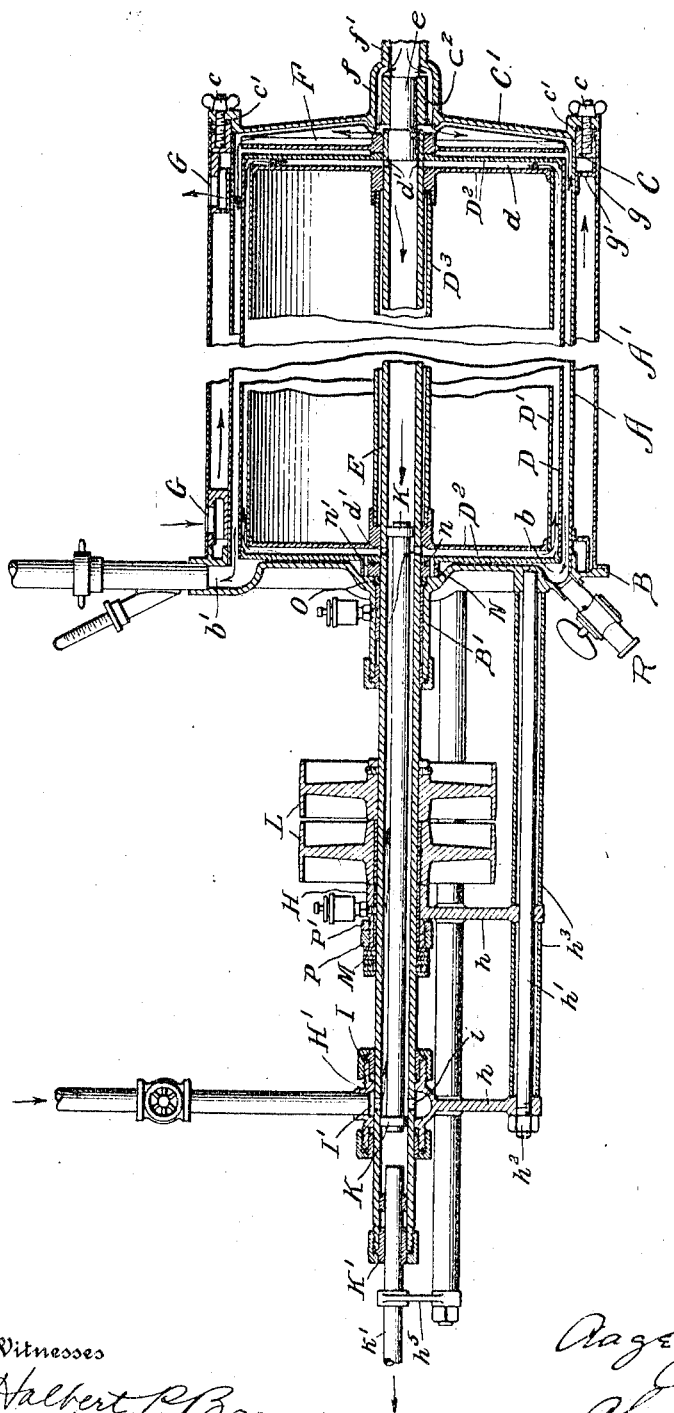

UNITED STATES PATENT OFFICE.

AAGE JENSEN, OF OAKLAND, CALIFORNIA.

LIQUID PASTEURIZER AND COOLER.

1,080,455.  Specification of Letters Patent.  Patented Dec. 2, 1913.

Application filed September 3, 1913. Serial No. 787,995.

*To all whom it may concern:*

Be it known that I, AAGE JENSEN, a citizen of the United States, residing at Piedmont, Oakland, in the county of Alameda and State of California, have invented certain new and useful Improvements in Liquid Pasteurizers and Coolers; and I do hereby declare the following to be a full, clear, and exact description of the same, reference being had to the accompanying drawings, forming part of this specification, and to the figures and letters of reference marked thereon.

This invention relates to apparatus designed more especially for the treatment of milk, particularly milk in the state known as whole milk, although it is well adapted for treating, by pasteurization, cream, either sweet or sour, or milk which is not sour.

The objects of the invention are to provide a relatively small and compact apparatus, which will, by a continuous process, treat large volumes of the liquid at a rapid rate, without injuring or materially changing the constituents, either chemically or by breaking up the butter-fat globules, thus making the apparatus particularly valuable for pasteurizing or treating a municipal milk supply immediately prior to the delivery of the same to the consumer.

Other objects of the invention are to provide an apparatus, the construction of which will permit of its being maintained in a highly sanitary condition, both by reason of the elimination of inaccessible joints or recesses in which germs may lodge and multiply and by reason of the provision of means whereby all surfaces with which the liquid to be treated contacts are made readily accessible for cleaning and sterilizing.

A further object of the invention is to provide a structure in which the liquid to be treated is caused to flow at high velocity between closely spaced surfaces movable with relation to each other, and both of which surfaces are maintained at the desired temperature by a circulating medium flowing through passages and ducts between which and the passages and ducts for the liquid to be treated there are no working joints, thus eliminating from the machine all danger of a commingling of the liquids or of an infection of one from the other, and as incident to this construction the liquid to be treated is conveyed through ducts and passages which are closed against the access of air whereby the machine is well adapted for either pressure or vacuum systems, the viscosity of the liquid being treated is not altered, and oxidation or the incorporation of air is effectually prevented.

Referring to the accompanying drawings, Figure 1 is a section in a longitudinal vertical plane through a machine embodying the present improvement, the supporting legs and brackets being omitted. Fig. 2 is a section in a transverse plane showing the relation of the cylindrical passages in and between the cylinder and drum. Fig. 3 is a diagrammatic elevation looking at the left hand end of Fig. 1 to show particularly the relation of the shaft bearing supports.

Like letters of reference in the several figures indicate the same parts.

The machine embodies in its construction a cylinder formed with inner and outer walls A and A', respectively, said cylinder being a substantially rigid structure adapted to be supported on suitable legs and brackets, not shown in the drawings. At one end, the cylinder is provided with a permanent head B, which head permanently closes the end of the space between the walls A and A', and is centrally provided with a bearing B' for a shaft to be presently described. In addition the head is preferably provided with an annular channel $b$ and a discharge opening $b'$ communicating with said annular channel $b$ at the top. At the opposite end from the head B the cylinder is provided with a ring C which closes the space between the inner and outer walls A, A', and serves as the seat for a removable head C', adapted to be clamped in position by suitable set screws or wing nuts $c$ preferably with an interposed sealing gasket of rubber or other suitable material indicated at the points $c'$.

Within the cylinder there is mounted to rotate a drum formed essentially by spaced cylindrical walls D and D', the outer wall D being spaced a very small distance from the inner wall A of the cylinder. The drum walls D, D' are mounted at their ends on heads $D^2$ rigidly connected centrally by a tubular shaft or sleeve $D^3$. The heads $D^2$ completely close the ends of the drum within the inner cylindrical wall D', and extending radially through the heads are channels or passages $d$ in communication at their outer ends or portions with the narrow space between the walls D and D', the area of the channels $d$ being such as to offer no obstruction to the radial flow of liquid to the peripheral space referred to, and they are so arranged in the heads D as to secure a uniform distribution of fluid around the whole periphery or circumference of the drum. The drum is itself mounted on a central tubular shaft E which is of considerably greater length than the cylinder, and extends out through the bearing B'. The opposite end of the shaft is provided with a journal of reduced diameter as at $e$, mounted in a bearing $c^2$ in the head C'. The journal $e$ completely closes the end of the tubular shaft E and, in position to register with the radial passages $d$, the shaft is provided with radial openings $d'$, there being corresponding radial openings in the shaft for registering with the radial passages in the head at the opposite end of the drum, whereby liquid may be circulated from the shaft radially through the drum heads into and through the peripheral space between the cylindrical drum walls.

Between the bearing $c^2$ and the drum head D', the shaft E is threaded for the reception of the hub of an impeller having radial impeller vanes F, and liquid to be treated is admitted to the end of the cylinder at the base of the impeller vanes through admission passages $f$ formed in the head C' around the bearing $c^2$, there being an external axial pipe connection $f'$ for the supply pipe which leads from any suitable source of supply, as, for example, a milk vat so arranged as to prevent the entry of air into the admission opening.

The liquid to be treated, which enters at the center of the cylinder adjacent the bases of the impeller vanes F, is driven radially by said impeller vanes into and through the very narrow space between the drum and cylinder, finding its exit through the opening $b'$ at the opposite end of the cylinder, and it is thus conducted through the machine in a course which is entirely free from any working joints in communication with any of the channels through which the heating or cooling medium is passed: that is to say, there are no working joints between the space within the cylinder and outside of the drum, and the channel formed by the radial tubular shaft, the radial passages in the drum head, or the spaces between the drum walls or between the cylinder walls, and consequently there is no danger of the liquids becoming commingled or of the liquid being treated becoming infected from the treating liquid or medium.

The treating liquid is passed through the space between the cylinder walls, from entrance and exit openings, indicated at G in Fig. 1, and it is distributed to said space, so as to insure a uniform flow to all points radial of the cylinder, by distributing partitions $g$ having suitably spaced and, if necessary, graduated openings $g'$ therein, as will be readily understood from Fig. 1, although in this figure the distributing partitions are shown only in section.

The treating liquid which is circulated through the peripheral space of the drum, passes through, that is to say, both into and out of the same end of the shaft E; thus, as shown in the drawing, the said shaft, in addition to being supported in the bearing B', also passes through bearings H and H' supported on spiders $h$ which latter are in turn mounted on rigid rods $h'$ secured at one end in the head B and at the opposite end having adjusting nuts $h^2$ thereon, there being spacing sleeves $h^3$ interposed between the spiders $h$ and head B for properly locating and holding the spiders and bearings in position. From Fig. 3 it will be seen that the supporting rods and spacing sleeves are preferably equally spaced angularly below the level of the shaft E so as to afford a maximum rigidity against any tendency to downward deflection.

The bearing H' before referred to constitutes in effect a coupling for one of the circulating pipe connections, and for this purpose it is provided with double packing boxes or glands I between which a chamber I' is formed for the circulating pipe connection and the wall of the shaft is provided with radial openings $i$ through which the treating liquid may pass into or out of the shaft. On the outer sides of the openings $i$ and openings $d'$ at the near end of the drum, the shaft is provided with transverse partitions K, and through these partitions there is a tube or axial pipe $k$ which serves to separate the incoming and outgoing passages for the treating liquid. In other words, the tubular shaft is divided into two independent passages, one communicating with the radial passages in each end of the drum. The extreme end of the shaft E is provided with a stuffing box or packing gland K' through which passes a pipe or tube $k'$ supported in an end spider $h^5$ carried by the outer rods $h'$, the arrangement being such that liquid may be introduced through either the connection $k'$ or I', and circulated through the tubular shaft, through the peripheral space in the drum, and out again, being discharged from the shaft at a point remote from the end of the cylinder and entirely away from any working joint where the liquid could commingle or contaminate the liquid being treated.

Rotation is imparted to the shaft preferably through the medium of fast and loose pulleys L mounted on the shaft between the bearing H and the bearing B' on the head of the cylinder. Outside of the bearing H the shaft is provided with a thrust collar and interposed ball bearing M for resisting longitudinal movement of the shaft, and opposed to this thrust bearing is a bearing in the head B preferably formed by a collar N fixed on the shaft and against which the head D² of the drum rests, there being an interposed sealing packing n and a suitable pin or other driving connection at n' for insuring the proper location of the drum on the shaft when it is clamped against the collar N by the action of the impeller when the latter is screwed on the shaft at the farther end of the drum. Suitable permanent sealing packing is introduced at O in front of the collar N to insure a tight joint and the bearing is supplied with grease preferably pressed into the same, as is now common in the arts where a tight joint is desired. In addition, the bearing B' is provided with an adjustable packing or gland of the well understood form.

To take up any longitudinal play and insure the retention of the bearing collar N in tight contact with its bearing face or permanent sealing packing in the head of the cylinder, the thrust bearing and collar N are adapted to coöperate with an adjustable seat formed by a sleeve or nut P threaded on the outer end of the bearing H and adapted to be held in adjusted position by a locking nut or ring P'. With this construction, the seat P may be adjusted so as to draw the shaft longitudinally, thereby seating the collar N and providing for such adjustment as may be necessary to take up any possible wear on the parts, and thereby prevent any leakage of the liquid being treated to the outside of the cylinder and correspondingly preventing the entry of any of the lubricant or grease from the bearing into the cylinder, where it might contaminate the liquid.

The liquid to be treated is circulated by the impeller vanes through the narrow space between the inner wall of the cylinder and outer wall of the drum, and owing to the very large surface area of this narrow passage, the liquid will be distributed in a very thin sheet, but will travel through said space at relatively high velocity. At the same time it will be subjected to what might be termed a rolling action, due to the rotation of the drum, all of such movements, however, being imparted to the liquid without material agitation, and without permitting any particle of the liquid to remain in contact with the surface of the drum or cylinder for a sufficient length of time to injuriously affect the same; that is to say, in pasteurizing milk, for example, the surfaces may both be heated to a much higher temperature than would be possible with other forms of apparatus, without injuring the milk, and the milk may be passed through the machine so as to effect pasteurization completely in a minimum length of time. There is no point where any of the liquid can eddy or remain in contact with a heated surface, nor is there any point where the liquid may come to rest and accumulate or propagate germs, the result being that with a machine of this character a germ count shows that the machine does not reduce the purity of the liquid at all, but, on the contrary, where the machine is used as a pasteurizer or sterilizer, the liquid is delivered practically free from injurious germ life. Furthermore, it is not possible for any of the liquid to pass through the machine without being subjected to the action of the treating temperature, as all of the liquid must flow in the narrow peripheral space between the cylindrical faces of the cylinder and drum.

The machine is a double surface machine, that is to say, both surfaces between which the liquid to be treated flows are controlled as to their temperature by the circulation of the treating medium in contact therewith, and the spaces through which the treating liquid flows in contact with the reverse faces of the treating surfaces are of small volumetric capacity, with the result that an extremely rapid circulation of the treating liquid is effected with a resultant economy and efficiency, to say nothing of the facility with which the temperature may be regulated accurately. The drum is light, and the body of the liquid which is carried by it during its rotation very small, as compared with the superficial area of the whole drum. Owing to this fact, the drum may be rotated with small power, and when necessity for cleaning arises, the light weight of the drum permits it to be readily handled by being drawn out of the cylinder after the removal of the head C' and impeller which holds the drum in place on its shaft.

For draining the cylinder of the liquid which is being treated, a bottom drain tap R may be provided in the lower portion of the head B and, of course, the external jacket may be similarly drained through a drain tap provided for that purpose, but not shown in the drawings.

The machine operates as its own pump and by its action does not reduce materially the size of the fat globules or clusters of the same, so that cream will rise readily on milk treated in the machine. No oxidation or the incorporation of free air is possible, as the machine is entirely closed to the air, and it is of such character that it will handle liquids of considerable viscosity, but will not change the viscosity of the liquid being handled by it.

Having thus described my invention, what I claim as new and desire to secure by Letters Patent of the United States, is:

1. A liquid treating apparatus embodying a cylinder, a drum mounted in the cylinder with its cylindrical wall spaced from the cylinder to form a narrow cylindrical chamber, both the cylinder and drum embodying means whereby a treating liquid may be circulated in contact with their cylindrical walls on both the outer and inner sides of the narrow cylindrical chamber, means for rotating the drum, an impeller mounted on one end of the drum to rotate in unison therewith, and cylinder heads at opposite ends of the drum, one of said heads being provided with an axial inlet for the admission of liquid to be treated centrally of the impeller and the other of said heads having an exit duct for the discharge of the treated liquid forced through the space between the drum and cylinder by the impeller.

2. In a liquid treating apparatus, the combination with the inclosing cylinder and drum mounted in the cylinder with their cylindrical walls spaced to form a narrow cylindrical chamber, and both embodying means whereby their walls may be heated, of impeller vanes on the end of the drum, a head for inclosing the end of the cylinder adjacent the impeller vanes, having a central bearing for the drum, and liquid admission openings at the base of the impeller vanes around the central bearing, a drum shaft, and means for rotating the drum mounted on the shaft at the opposite end of the cylinder from the impeller vanes.

3. A liquid treating apparatus embodying a cylinder, a rotary drum having its peripheral wall in proximity to the cylinder wall, cylinder heads in which the drum is journaled, ducts extending centrally through said heads and independently communicating respectively with the interior of the drum and with the space between the drum and cylinder, and an impeller between the end of the drum and head through which liquid is admitted to the space between the drum and cylinder.

4. A liquid treating apparatus embodying a cylinder, a rotary drum having its peripheral wall in proximity to the cylinder wall, heads on the cylinder inclosing the drum and having shaft bearings therein, a drum shaft journaled in said bearings, an impeller mounted on said shaft between one end of the drum and one of said heads, and a centrally arranged liquid admission duct for supplying liquid to be treated to the center of the impeller, whereby said liquid will be forced through the space between the drum and cylinder walls.

5. A liquid treating apparatus embodying a cylinder, a rotary drum having its peripheral wall in proximity to the cylinder wall, a cylinder head having a centrally arranged duct for the liquid to be treated, an impeller mounted on the end of the drum intermediate the drum and said cylinder head, a head on the opposite end of the cylinder, a tubular shaft for the drum journaled in said last mentioned head, ducts for supplying liquid to the interior of the drum extending through said shaft, and means for rotating the drum mounted on the shaft outside of the cylinder head.

6. In a liquid treating appartus, the combination with a fixed cylinder having a fixed head at one end thereof with a centrally arranged bearing therein, bearings rigidly connected with said head but spaced from the bearing in the head, and a shaft journaled in said bearings and extending longitudinally through the cylinder, of a drum removably mounted on the shaft within the cylinder, means at the end of the shaft for locking the drum in position, and a removable cylinder head having a bearing therein for the end of the drum shaft.

7. In an apparatus for treating liquids, the combination with a fixed cylinder having double cylindrical walls with a space between the same for the circulation of a treating medium, a fixed head on one end of said cylinder having a central shaft bearing therein, and a tubular shaft journaled in said bearing and having apertures leading therefrom in proximity to the ends of the cylinder, of a drum removably mounted on said shaft within the cylinder, said drum embodying spaced peripheral walls and heads having radial passages therethrough in communication with the spaces between the peripheral drum walls, and at their inner portions positioned to register with the openings in the tubular shaft, means for holding said drum in position on the shaft with the apertures and passages in registery, and a removable head for closing the opposite end of the cylinder.

8. In an apparatus for treating liquid, the combination with a cylinder having double peripheral walls forming a space for the circulation of a treating medium, a tubular shaft journaled in said cylinder and having lateral openings in proximity to opposite ends of the cylinder, of a drum mounted on the shaft and embodying double peripheral walls forming a space for the circulation of a treating medium, drum heads closing the ends of the drum and having radial ducts therethrough, communicating at their inner ends with lateral apertures in the shaft and at their outer ends communicating with the space between the drum walls, and means for circulating liquid to be treated between the drum and cylinder.

9. In a liquid treating apparatus, the combination with the cylinder having double peripheral walls forming a space for the circulation of a treating medium, heads for closing the opposite ends of said cylinder and having duct apertures therein for the liquid to be treated, and a tubular shaft journaled in the cylinder heads and having lateral openings in proximity to opposite ends of the cylinder, of a drum mounted on said shaft and embodying double peripheral walls forming a space between them for the circulation of a treating medium, drum heads for closing the ends of the drum having radial ducts communicating at their outer ends with the space between the peripheral walls of the drum and at their inner ends registering with the lateral openings in the tubular shaft, and means carried by said shaft for forcing the liquid to be treated through the space between the drum and cylinder.

10. In a liquid treating apparatus, the combination with the cylinder having a permanent head at one end thereof and a shaft journaled centrally in said head, of a drum removably mounted on said shaft and with its peripheral wall in proximity to the cylinder wall forming a narrow space for the circulation of the liquid being treated, an impeller mounted on said shaft and forming the means for retaining the drum in position thereon, and a removable cylinder head for closing the end of the cylinder.

11. In a liquid treating apparatus, the combination with a cylinder embodying spaced cylindrical walls forming a chamber for the circulation of a treating medium and having inlet and eduction openings therein, partitions interposed in said chamber for distributing the flow of liquid uniformly throughout the circumference of the chamber, of heads for closing the ends of the cylinder and having inlet and eduction openings therein for the liquid to be treated, a shaft journaled in said heads, a drum mounted on said shaft and embodying spaced peripheral walls forming a chamber for the circulation of a treating medium, heads having radial ducts therein communicating at their outer ends with said peripheral chamber in the drum, and independent ducts communicating with the inner ends of said radial ducts for supplying the treating medium thereto.

12. In a liquid treating apparatus, the combination with the cylinder having double peripheral walls forming a chamber for the circulation of the treating medium, a double-walled drum mounted in said cylinder and embodying a central tubular sleeve with heads rigidly connected therewith and having radial ducts therethrough communicating at their outer ends with the chamber formed by the double peripheral walls of the drum, of a central tubular shaft on which said drum is mounted, having radial openings registering with the ducts in the drum heads, and means for dividing said tubular shaft into independent ducts for directing the treating medium in a circuit through the drum heads and peripheral chamber, said shaft ducts having independent pipe connections on the exterior of the cylinder.

13. In a liquid treating apparatus, the combination with a cylinder having double peripheral walls forming a chamber for a treating medium, a head for closing one end of said cylinder and having a central shaft bearing therein, and a tubular shaft mounted in said bearing and having a collar mounted thereon within the head, of a thrust bearing mounted on said shaft outside of the head, with means for adjusting said thrust bearing to hold the collar in engagement with the head whereby a liquid-tight bearing is formed, a drum removably mounted on the shaft within the cylinder, a removable head for closing the far end of the cylinder, and ducts for admitting a treating liquid to the drum and for admitting a liquid to be treated between the drum and cylinder.

AAGE JENSEN.

Witnesses:
L. N. GSCHWIND,
A. GRIFFITHS.